United States Patent
Saito

(12) 
(10) Patent No.: US 6,387,292 B1
(45) Date of Patent: May 14, 2002

(54) PROCESS FOR PRODUCING ANTI-SOIL FINISHING AGENT

(75) Inventor: Chiaki Saito, Iwaki (JP)

(73) Assignee: Nippon Mektron, Limited (JP)

(*) Notice: Subject to any disclaimer, the term of this patent is extended or adjusted under 35 U.S.C. 154(b) by 0 days.

(21) Appl. No.: 09/627,468

(22) Filed: Jul. 28, 2000

(30) Foreign Application Priority Data

Aug. 3, 1999 (JP) ............................................. 11-219528
Apr. 21, 2000 (JP) ........................................ 2000-120566

(51) Int. Cl.⁷ .......................... C09K 3/22; D06M 15/00
(52) U.S. Cl. ...................... 252/8.62; 525/199; 526/245
(58) Field of Search ........................ 252/8.62; 525/199; 526/245

(56) References Cited

U.S. PATENT DOCUMENTS

| | | | | |
|---|---|---|---|---|
| 4,810,411 A | * | 3/1989 | Pesco et al. ................ | 252/8.62 |
| 5,143,991 A | * | 9/1992 | Amimoto et al. ........... | 526/245 |
| 5,370,919 A | * | 12/1994 | Fieuws et al. ................ | 428/96 |
| 6,013,732 A | * | 1/2000 | Yamana et al. ............. | 525/153 |
| 6,130,298 A | * | 10/2000 | Yamana et al. .......... | 525/330.7 |
| 6,274,060 B1 | * | 8/2001 | Sakashita et al. .......... | 252/8.62 |

FOREIGN PATENT DOCUMENTS

| | | | |
|---|---|---|---|
| JP | 52-35033 | | 7/1977 |
| JP | 53-134786 | | 11/1978 |
| JP | 60-104576 | * | 6/1985 |
| JP | 61-266487 | * | 11/1986 |
| JP | 63-474 B2 | | 1/1988 |
| JP | 4-68006 | * | 3/1992 |
| JP | 6-017034 A | * | 1/1994 |
| JP | 9-111228 A | * | 4/1997 |

* cited by examiner

*Primary Examiner*—Anthony Green
(74) *Attorney, Agent, or Firm*—Baker & Daniels

(57) ABSTRACT

An anti-soil finishing agent is produced by copolymerizing a fluoroalkyl group-containing monomer with a hydrophilic group-containing monomer in polypropylene glycol having an average molecular weight of not more than about 1,000 or a mixture thereof with a water-soluble organic solvent having a boiling point of not less than 150° C. or a flash point of more than 61° C. The anti-soil finishing agent has not only a high flash point, but also distinguished frozen stability and high temperature stability (storage stability at a temperature of about 40~50° C. higher than room temperature).

9 Claims, No Drawings

PROCESS FOR PRODUCING ANTI-SOIL FINISHING AGENT

BACKGROUND OF THE INVENTION

1. Field of the Invention

The present invention relates to a process for producing an anti-soil finishing agent, and more particularly a process for producing an anti-soil finishing agent having a high flash point, a distinguished frozen stability, etc.

2. Related Art

Anti-soil finishing of fabrics is usually carried out by making fabrics hydrophilic or finishing with fluorine-based resins, silicone resins, oil and fat, etc. Above all, finishing with fluorine-based resin is based mainly on anti-soil finishing effect of fluorine on water- and oil-repellency or on a flip-flop mechanism derived by combination with hydrophilic groups, and is now most widely used owing to their properties and easy finishing procedure.

The finishing with the fluorine-based resin is carried out mainly with copolymers of fluoroalkyl group-containing (meth)acrylate esters with hydrophilic group-containing (meth)acrylate esters (e.g. JP-B-52-35033, JP-B-63-474, U.S. Pat. No. 3,574,791, etc.), and the copolymers are generally produced by solution polymerization, where the copolymerization reaction is based on reaction of monomers of mutually contracting properties, i.e. reaction of fluoroalkyl group-containig monomers with hydrophilic group-containing monomers and therefore the solution polymerization reaction is carried out upon appropriate selection of a best solvent for both monomers. Practically, solvents with a low flash point, e.g. alcohols such as ethanol, isopropanol, etc. and ketones such as acetone, methylisobutyl ketone, etc. or mixtures thereof with water are used in most cases (JP-A-53-134786).

Solution polymerization procedure requires no pre-emulsification by a homogenizer, etc. and no complicated polymerization operation, but a high flash point type is desirable from the viewpoints of a risk problem of solvent inflammability, etc. and an ecological problem. One of these problems can be easily solved by using a solvent of high flash point, but the polymerization reaction using such a solvent is not only costly, but also brings about a failure in dispersion when the polymerization reaction solution is diluted with water, resulting in poor stability as another problem.

SUMMARY OF THE INVENTION

An object of the present invention is to provide a process for producing an anti-soil finishing agent having not only a high flash point, but also distinguished frozen stability and high temperature stability (storage stability at a temperature of about 40~50° C. higher than room temperature).

The object of the present invention can be attained by producing an anti-soil finishing agent by copolymeriging a fluoroalkyl group-containing monomer with a hydrophilic group-containig monomer in polypropylene glycol having an average molecular weight of not more than about 1,000 or a mixture thereof with a water-soluble organic solvent having a boiling point of not less than 150° C. or a flash point of more than 61° C.

DETAILED DESCRIPTION OF THE INVENTION

Generally, fluoroalkyl group-containing (meth)acrylate esters are used as a fluoroalkyl group-containing monomer, where a perfluoroalkyl group Rf having 6, 8, 10 or 12 carbon atoms or a mixture thereof is preferably used as a fluoroalkyl group and specifically include the following compounds, wherein m being 4, 6, 8, 10 or 12, or a mixture thereof:

$CH_2=CHCOOCH_2CH_2Rf$
$CH_2=C(CH_3)COOCH_2CH_2Rf$
$CH_2=CHCOOCH_2CH(OH)CH_2Rf$
$CH_2=C(CHCOOCH_2CH(OH)CH_2Rf$
$CH_2=CHCOO(CH_2)_3C_8F_{17}$
$CH_2=CHCOO(CH_2)_4CEF_{17}$
$CH_2=CHCOOCH_2CH_2(CF_2)_mCF(CF_3)$ 2
$CH_2=C(CH_3)COOCH_2CH_2(CF_2)_mCF(CF_3)_2$
$CH_2=CHCOOCH_2CH_2N(CH_3)SO_2C_8F_{17}$
$CH_2=C(CH_3) COOCH_2CH_2N(CH_3)SO_2C_8F_{17}$
$CH_2=CHCOOCH_2CH_2N(C_2H_5)SO_2C_8F_{17}$
$CH_2=C(CH_3)COOCH_2CH_2N(C_2H_5)SO_2C_8F_{17}$
$CH_2=CHCOOCH_2CH_2N(C_3H_7)SO_2C_8F_{17}$
$CH_2=C(CH_3)COOCH_2CH2N(C_4H_9)SO_2C_8F_{17}$
$CH_2=CHCOOCH_2CH_2N(C_4H_9)SO_2C_8F_{17}$
$CH_2=C(CH_3)COOCH_2CH_2N(C_4H_9)SO_2C_8F_{17}$

Generally, hydrophilic group-containing (meth)acrylate esters are used as a hydrophilic group-containing monomer, and compounds represented by the following general formula are preferably used:

$CH_2=CRCOO(CH_2CH_2O)_m[CH_2CH(CH_3)O]_nR'$

R: Hydrogen atom or methyl group
R': Hydrogen atom or lower alkyl group
m: Integer of 1 or more
n: 0 or an integer of 1 or more
m+n:1–60

The fluoroalkyl group-containing monomer and the hydrophilic group-containing monomer are subjected to copolymerization reaction so that the resulting copolymer can have a ratio of the former to the latter of about 30–80 wt. % : about 70–20 wt. %, preferably about 30–60 wt. % : about 70–40 wt. %, total being 100 wt. %. An appropriate monomer ratio of the copolymer can be selected in view of a balance between the lipophilic property and the hydrophilic property of the resulting copolymer.

In addition to the foregoing monomers, other vinyl monomers can be further copolymerized therewith in a proportion of not more than about 30 wt. % to the sum total of the foregoing monomers to modify the copolymer or improve the adhesiveness to fibers. Such vinyl monomers include 3% (meth)acrylate esters having other hydrophobic groups than fluorine, hydrophilic group-containing (meth)acrylate esters having a lower molecular weight than that of the aforementioned hydrophobic group-containing monomers, cationic or anionic (meth)acrylate esters, etc. and specifically include the following compounds:

$CH_2=CHCOOCH_2CH(OH) CH_3$
$CH_2=C(CH_3)COOCH_2CH(OH)CH_3$
$CH_2=CHCOOCH_2CH(OH)CH_2OH$
$CH_2=C(CH_3)COOCH_2CH(OH)CH_2OH$
$CH_2=CHCOOCH_2CH(OH)CH_2CH_3$
$CH_2=C(CH_8)COOCH_2CH(OH)CH_2CH_3$
$CH_2=CHCOOCH_2CH_2CH_2CH_2OH$
$CH_2=C(CH_3)COOCH_2CH_2CH_2CH_2OH$
$CH_2=CHCOOCH_2CH_2OCH_3$
$CH_2=C(CH_3)COOCH_2CH_{2OCH3}$
$CH_2=CHCOOCH_2CH_2OCH_2CH_3$
$CH_2=C(CH_3)COOCH_2CH_2OCH_2CH_3$ $CH_2=CHCOOCH_2CH_2OCH_2CH_2CH_2CH_3$
$CH_2=C(CH_3)COOCH_2CH_2OCH_2CH_2CH_2CH_3$
$CH_2=CHCOOC_2H_4N^+(CH_3)_3Cl^-$
$CH_2=C(CH_3)COOC_2H_4N^+(CH_3)Cl^-$
$CH_2=C(CH_3)COOC_2H_4N^{30}\ (CH_3)_3OSO_3CH_3^{31}$
$CH_2=C(CH_3)COOC_2H_4N^+(C_2H_5)_2HCl^{31}$
$CH_2=C(CH_3)COOC_2H_4N^+(CH_3)_3Br^{31}$
$CH_2=C(CH_3)COOC_2H_4N^+H(C_2H_5)_2CH_3COO^{31}$
$CH_2=C(CH_3)COOCH_2CH(OH)CH_2N^+(C_2H_5)_3Cl^{31}$

The following vinyl compounds can be also likewise used: benzyl (meth)acrylate, cyclohexyl (meth)acrylate, methyl (meth)acrylate, ethyl (meth)acrylate, propyl (meth)acrylate, butyl (meth)acrylate, hexyl (meth)acrylate, lauryl (meth)acrylate, stearyl (meth)acrylate, acrylonitrile, acrylamide, vinyl acetate, styrene, chlorostyrene, chlorobutyl vinyl ether, chloropropyl vinyl ether, chloroethyl vinyl ether, chloromethyl vinyl ether, N-methylol (meth)acrylamide, N-methylol acrylamide butyl ether, N-methylol (meth)acrylamide methyl ether, etc.

The foregoing monomers are subjected to solution polymerization in polypropylene glycol of water-soluble diol type or triol type having an average molecular weight of not more than about 1,000. The polypropylene glycol is used in an amount of about 1–10 times, preferably about 1.5–6 times the total weight of the monomers.

A water-soluble organic solvent having a boiling point of not less than 150° C. or a flash point of more than 61° C. can be used together with the polypropylene glycol, where the polypropylene glycol is used in an amount of about 0.1–2 times the total weight of the monomer and the water-soluble organic solvent is used in an amount of not more than about 3 times the total weight of the monomers.

The water-soluble organic solvent for use in the present invention includes, e.g. glycol ethers such as ethylene glycol monomethyl ether, ethylene glycol monoethyl ether, ethylene glycol monopropyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, etc., or their acetates, and aprotic polar solvents of low toxicity and high polarity, soluble in most organic solvents, such as N,N-dimethylacetamide, dimethyl sulfoxide, N,N-dimethylformamide, N-methyl-2-pyrrolidone, etc.

Copolymerization reaction in such a solvent can be carried out by the ordinary solution polymerization procedure.

The anti-soil finishing agent obtained by the solution polymerization procedure is used as an aqueous dispersion upon dilution with water, where the aqueous emulsion desirably has a total content of polypropylene glycol and copolymer (as will be hereinafter referred to as "measurable solid content") of not less than about 20 wt. %, preferably about 20–40 wt. % on the basis of the aqueous dispersion. Below about 20 wt. %, the stability will be lowered in some cases.

In practical anti-soil finishing, the aqueous dispersion is further diluted with water to adjust a copolymer concentration (calculated from the amounts of monomers subjected to the copolymerization reaction) of the resulting diluted aqueous dispersion to about 0.3–7 wt. %, preferably about 0.5–5 wt. %, and used to give finished fabrics an anti-soil property or a soil cleanability.

When a fiber finishing agent usually used in fiber finishing, such as melamine resin, glyoxal resin, triazine-based resin, uronic resin, ethylene-urea-based resin, propylene-urea-based resin, etc. is used together with the anti-soil finishing agent, durability, etc. can be much more improved. It is preferable to use glyoxal resin at a concentration of about 1–10 wt. % or melamine resin at a concentration of about 0.5–1 wt. % in the diluted aqueous dispersion together with their curing catalyst.

Anti-soil finishing is carried out by any fabric-penetrating procedure such as a pad process, a dip dyeing process, a spray process, a coating process, etc. For example, a pad process applicable to cotton fabrics is carried out by padding in a pickup ratio of about 70–100%, drying at about 70°–160° C. for about 1–3 minutes and curing at about 130°–180° C., which must be higher than the drying temperature used, for about 1.5–2 minutes. For other fabrics than the cotton fabrics, finishing conditions depend on fabric species.

The present anti-soil finishing agent has a high flash point and the aqueous dispersion prepared therefrom has distinguished frozen stability, high temperature stability, etc. as well as the high flash point, and particularly shows high levels of anti-soil property, soil cleanability, recontamination-preventive property, washing durability, etc. in case of synthetic fibers such as polyester, polyamide (nylon) fibers, etc. The present anti-soil finishing agent having such characteristics are distinguished not only in the antisoil finishability, but also in safety, as compared with the conventional anti-soil finishing agents obtained by polymerization in a solvent of low flash point, and thus is effectively easier in handling such as storage, etc.

PREFERRED EMBODIMENTS OF THE INVENTION

The present invention will be described in detail below, referring to Examples.

EXAMPLE 1

The following compounds were charged into a 300-ml separable flask:

| | |
|---|---|
| $CH_2=CHCOOCH_2CH_2Rf$ | 30 g |
| (Rf is a mixture of perfluoroalkyl groups having 6, 8, 10 and 12 carbon atoms with 9 carbon atoms on average) | |
| $CH_2=C(CH_3)COO(CH_2CH_2O)_7[CH_2CH(CH_3)O]_3H$ | 30 g |
| $CH_2=CHCOO(CH_2)_2OH$ | 3 g |
| $CH_2=CHCONHCH_2O(CH_2)_3CH_3$ | 3 g |
| n-Dodecylmercaptan | 1 g |
| Polypropylene glycol (average molecular weight: about 400) | 130 g |

After flushing of the flask with a nitrogen gas, 2.5 g of azobis-isobutyronitrile was further added thereto to conduct polymerization reaction at 65° C. for 20 hours. An anti-soil finishing agent containing 96.98% of measurable solid content (measured after drying in an oven at 100° C. for 15 hours) was obtained as a white solution.

EXAMPLE 2

In Example 1, the amount of polypropylene glycol (average molecular weight: about 400) was changed to 55 g, and 55 g of polypropylene glycol (average molecular weight: about 700) and 20 g of dipropylene glycol monomethyl ether were further added thereto. An anti-soil finishing agent containing 87.02% of measurable solid content was obtained as a milky white solution.

EXAMPLE 3

In Example 1, the amount of n-dodecylmercaptan was changed to 1.5 g, that of azobisisobutyronitrile to 3 g and that of polypropylene glycol (average molecular weight: about 400) to 30 g. 100 g of dipropylene glycol monomethyl ether was further added thereto. An anti-soil finishing agent containing 47.69% of measurable solid content was obtained as a milky white solution.

EXAMPLE 4

The following compounds were charged into a 300-ml separable flask:

| | |
|---|---|
| $CH_2=CHCOOCH_2Rf$ | 35 g |
| (Rf is a mixture of perfluoroalkyl groups having 6, 8, 10 and 12 carbon atoms with 9 carbon atoms on average) | |
| $CH_2=C(CH_3)COO(CH_2CH_2O)_7[CH_2CH(CH_3)O]_3H$ | 11 g |
| $CH_2=C(CH_3)COO(CH_2CH_2O)_9CH_3$ | 7 g |
| $CH_2=C(CH_3)COO(CH_2CH_2O)_4CH_3$ | 3 g |
| $CH_2=C(CH_3)COO(CH_2CH_2O)_2H$ | 2 g |
| $CH_2=CHCOOCH_2CH_2OH$ | 2 g |
| $CH_2=CHCONHCH_2O(CH_2)_3CH_3$ | 2 g |
| n-Dodecylmercaptan | 1.5 g |
| Polypropylene glycol (average molecular weight: about 400) | 50 g |
| Dipropylene glycol monomethyl ether | 80 g |

After flushing of the flask with a nitrogen gas, 3 g of azobis-isobutyronitrile was further added thereto to conduct copolymerization reaction at 65° C. for 20 hours. An anti-soil finishing agent containing 57.41% of measurable solid content was obtained as a milky white solution.

EXAMPLE 5

The following compounds were charged into a 500-ml separable flask:

| | |
|---|---|
| $CH_2=CHCOOCH_2CH_2Rf$ | 35 g |
| (Rf is a mixture of perfluoroalkyl groups having 6, 8, 10 and 12 carbon atoms with 9 carbon atoms on average) | |
| $CH_2=C(CH_3)COO(CH_2CH_2O)_7[CH_2CH(CH_3)O]_3H$ | 11 g |
| $CH_2=C(CH_3)COO(CH_2CH_2O)_4CH_3$ | 12 g |
| $CH_2=C(CH_3)COOCH_2(CH_2)_{10}CH_3$ | 2 g |
| $CH_2=CHCOOCH_2CH_2OH$ | 2 g |
| n-Dodecylmercaptan | 1.5 g |
| Polypropylene glycol (average molecular weight: about 400) | 50 g |
| N-methyl-2-pyrrolidone | 80 g |

After flushing of the flask with a nitrogen gas, 3 g of azobis-dimethylvaleronitrile was added thereto to conduct copolymerization reaction at 65° C. for 20 hours. Then, 150 g of water was added thereto, and an anti-soil finishing agent containing 32.50% of measurable solid content was obtained as a semi-transparent solution.

COMPARATIVE EXAMPLE 1

In Example 1, 100 g of ethanol was used in place of 130 g of polypropylene glycol. A solution containing 37.46% of measurable solid content was obtained, but was highly vicous and foamable.

COMPARATIVE EXAMPLE 2

In Example 1, 10 g of acetone was used in place of 130 g of polypropylene glycol. An anti-soil finishing agent containing 37.95% of measurable solid content was obtained as a transparent solution.

COMPARATIVE EXAMPLE 3

In Example 1, 0.76 g of Emulgen 950 (trademark of a product commercially available from Kao Corp., Japan) and 0.84 g of Emulgen 930 (trademark of a product commercially available from Kao Corp., Japan), both being non-ionic surfactants, 30.15 g of acetone and 121.67 g of water were used in place of 130 g of polypropylene glycol. 1.2 g of azobisisobutyroamizine.dihydrochloride was used as a polymerization initiator in place of 2.5 g of azobisisobutyronitrile. Polymerization reaction product was gelled.

The anti-soil finishing agents and the solutions obtained in Examples 1 to 5 and Comparative Examples 1 and 2 were diluted with water, respectively, to adjust the calculated copolymer concentrations to 17.5 wt. %, thereby preparing aqueous dispersions. In case of Comparative Example 1, the copolymers were precipitated upon formation of a discrete layer, whereas neither precipitation nor formation of such a discrete layer were observed in other cases.

TABLE 1

| | Aqueous dispersion | Measurable solid content (%) |
|---|---|---|
| Example 1 | white | 51.50 |
| Example 2 | white | 46.10 |
| Example 3 | transparent | 25.30 |
| Example 4 | milky white | 30.38 |
| Example 5 | semi-transparent | 30.60 |
| Comp. Ex. 2 | semi-transparent | 17.70 |

Stability of Aqueous Dispersions Obtained in Example 3 and Comparative Example 2

High temperature stability test. The aqueous dispersions were placed in an incubator at 45° C to visually observe changes after 30 days. No changes were observed at all in both cases.

Frozen stability test: The aqueous dispersions were frozen by placing them in a refrigerator at −15° C. for 24 hours, and then melted at room temperature to visually observe solution changes. In case of Example 3, no changes were observed after 2 cycles of freeze-melt, whereas in case of Comparative Example 2, precipitates were observed after the first cycle.

Dilution stability test: The aqueous dispersions were further diluted with water to 10 times or 20 times as thin, and the resulting diluted solutions were left standing at room temperature for 7 days to visually observe presence of precipitates or state changes. No changes were observed at all in case of dilution to 10 times or 20 times as thin.

Flash Point Measurement of Aqueous Dispersions Obtained in Example 3 and Comparative Example 2

According to the tag closed type flash point test, the aqueous dispersion of Example 3 was judged to have no flash point, because fire extinguishment was observed at 93° C., whereas in case of Comparative Example 2, a flash point was observed at not more than 30° C.

Anti-soil Property and Soil Cleanability Test

Preparation of fabric finishing solutions: Dilute aqueous dispersions were prepared as fabric finishing solutions by adding to 10 parts by weight of the aqueous dispersion of each of Example 1 to 5 and Comparative Example 2 shown in the foregoing Table 1, 0.7 parts by weight of melamine resin (Sumitex Resin M-3, trademark of a product commercially available from Sumitomo Chemical Co., Ltd., Japan), 0.3 parts by weight of a melamine resin catalyst (Sumitex Accelerator ACX, trademark of a product commercially available from Sumitomo Chemical Co., Ltd., Japan), and 89 parts by weight of water.

Fabric finishing solutions were prepared from 4.67 parts by weight of copolymers of Comparative Example 2, 7.8 parts by weight of polypropylene glycol (average molecular weight: about 400), 0.7 parts by weight of melamine resin (Sumitex resin M-3), 0.3 parts by weight of melamine resin catalyst (Sumitex Accelerator ACX) and 81.2 parts by weight of water, as Comparative Example 4.

Fabric finishing: Fabrics, 25 cm×25 cm, of T/C broadcloth, polyester Jersey and polyester Amunzen were dipped into each of the foregoing fabric finishing solutions, squeezed through a mangle to retain 75 wt. % of the finishing solution on the fabrics on the basis of the weight of fabrics, and dried at 110° C. for 2 minutes and cured at 170° C. for one minute in case of the TIC broadcloth, or dried at 110° C. for 2 minutes and cured at 150° C. for 0.5 minutes in case of the polyester fabrics.

Test: One drop of dirty motor oil (after 4,000 km driving) was made to fall onto the finished fabrics, followed by being left standing at room temperature for one hour under a load of 7 g /cm$^2$. Washing was then carried out according to following "wash 1" procedure and test results were evaluated according to the following criterion:

Mark 1: Very considerable stain remaining
Mark 2: Considerable stain remaining
Mark 3: Slight stain remaining
Mark 4: Unremarkable stain remaining
Mark 5: No stain remaining
Washing Durability Test Finished fabrics were washed according to "wash 2" or "wash 3" procedures and then subjected to the foregoing "anti-soil property and soil cleanability test". [Wash 1]: Washing is carried out in a washing machine for 15 minutes with 30 liters of an aqueous solution of a washing detergent (Compact Attack, trademark of a product commercially available from Kao Corp., Japan) (concentration: 0.67 g /L; temperature: 40° C.) followed by spin-drying for 3 minutes, rinsing for 15 minutes, spin-drying for 5 minutes and air drying or oven drying for 5 minutes

[Wash 2]: Washing is carried out in a washing machine for 50 minutes with 20 liters of an aqueous solution of a washing detergent (Compact Attack) (concentration: 0.67 g/L; bath ratio of fabric to the aqueous solution of washing water =1:30 by volume; temperature:40° C.), followed by spin-drying for 3 minutes, rinsing for 15 minutes, spin-drying for 5 minutes and air drying [Wash 3]: In the foregoing "wash 2", the washing time is changed to 100 minutes The results of the foregoing anti-soil property and soil cleanability are given in the following Table as an initial performance and those of the washing durability test are given therein as "wash 2" results and "wash3" results, shown by the mark number, respectively.

TABLE 2

| Test fabrics | Ex.1 | Ex.2 | Ex.3 | Ex.4 | Ex.5 | Comp. Ex.2 | Comp. Ex.4 |
|---|---|---|---|---|---|---|---|
| T/C Broadcloth | | | | | | | |
| Initial performance | 5 | 5 | 5 | 5 | 5 | 5 | 4 |
| "wash 2" results | 4 | 4 | 4 | 5 | 4 | 4 | 4 |
| "wash 3" results | 4 | 4 | 4 | 4 | 4 | 4 | 4 |
| Polyester Jersey | | | | | | | |
| Initial performance | 5 | 5 | 5 | 5 | 5 | 3 | 4 |
| "wash 2" results | 3 | 4 | 4 | 4 | 4 | 2 | 2 |
| "wash 3" results | 3 | 3 | 3 | 4 | 3 | 1 | 2 |

TABLE 2-continued

| Test fabrics | Ex.1 | Ex.2 | Ex.3 | Ex.4 | Ex.5 | Comp. Ex.2 | Comp. Ex.4 |
|---|---|---|---|---|---|---|---|
| Polyester Amunzen | | | | | | | |
| Initial performance | 5 | 5 | 5 | 5 | 5 | 4 | 5 |
| "wash 2" results | 3 | 4 | 4 | 4 | 4 | 2 | 2 |
| "wash 3" results | 3 | 3 | 3 | 4 | 3 | 1 | 2 |

It can be seen from the foregoing results that:

(1) there are no large differences in the results in case of TIC broadcloth test fabrics, but the results of Examples are clearly better in case of polyester fabrics; and (2) in Comparative Example 4 based on the post addition of polypropylene glycol the performance are somewhat improved in case of the polyester fabrics, but are not so good as those of Examples based on addition of polypropylene glycol during the polymerization reaction.

What is claimed is:

1. A process for producing an anti-soil finishing agent, which comprises copolymerizing a fluoroalkyl group-containig (meth)acrylate ester with a hydrophilic group-cotaining (meth)acylate ester in polypropylene glycol having an average molecular weight of not more than about 1,000.

2. A process according to claim 1, wherein the hydrophilic group-containing (meth)acylate ester is a (meth)acrylate ester represented by the following general formula:

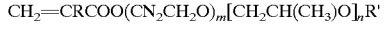

$$CH_2=CRCOO(CN_2CH_2O)_m[CH_2CH(CH_3)O]_nR'$$

where R is a hydrogen atom or a methyl group; R' is a hydrogen atom or a lower alkyl group; m is an integer of 1 or more, n is 0 or an integer of 1 or more; and m+n is 1–60.

3. A process according to claim 1, wherein a water-soluble organic solvent having a boiling point of not less than 150° C. or a flash point of more than 61° C. is used together with the polypropylene glycol.

4. A process according to claim 3, therein the water-soluble organic solvent having a boiling point of not less than 150° C. or a flash point of more than 61° C. is a glycol ether or its acetate.

5. A process according to claim 3, wherein the water-soluble organic solvent having a boiling point of not less than 150° C. or a flash point of more than 61° C. is an aprotic polar solvent.

6. An aqueous dispersion of an anti-soil finishing agent produced by copolymerizing a fluoroalkyl group-containing (meth)acrylate ester with a hydrophilic group-containing (meth)acrylate ester in polypropylene glycol having an average molecular weight of not more than about 1,000.

7. An aqueous dispersion according to claim 6, wherein the aqueous dispersion contains more than 20 wt. % of polypropylene glycol and the resulting copolymer in total.

8. An aqueous dispersion according to claim 6, wherein the aqueous dispersion further contains glyoxal resin at a concentration of about 1–10 wt. % or melamine resin at a concentration of about 0.5–1 wt. % in the diluted aqueous dispersion.

9. An aqueous dispersion according to claim 8, wherein glyoxal resin or melamine resin is used as the fiber finishing agent together with a curing catalyst for the fiber finishing agent.

* * * * *